(No Model.)
W. WESTLAKE.
MACHINE FOR FLANGING SHEET METAL.
No. 533,976. Patented Feb. 12, 1895.
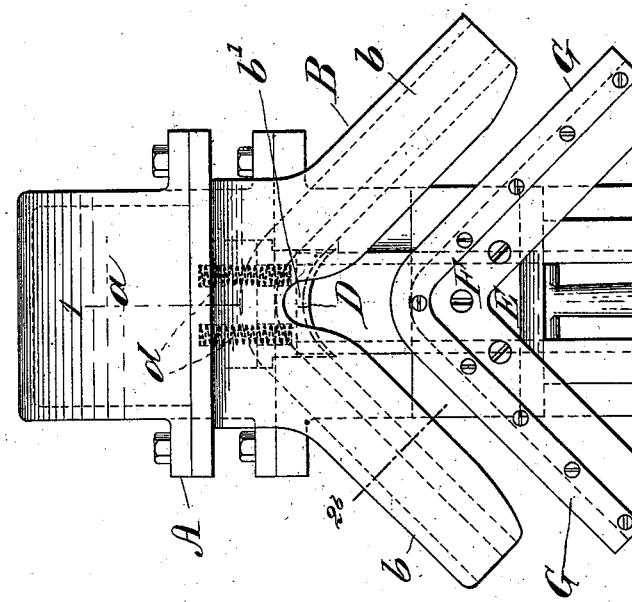
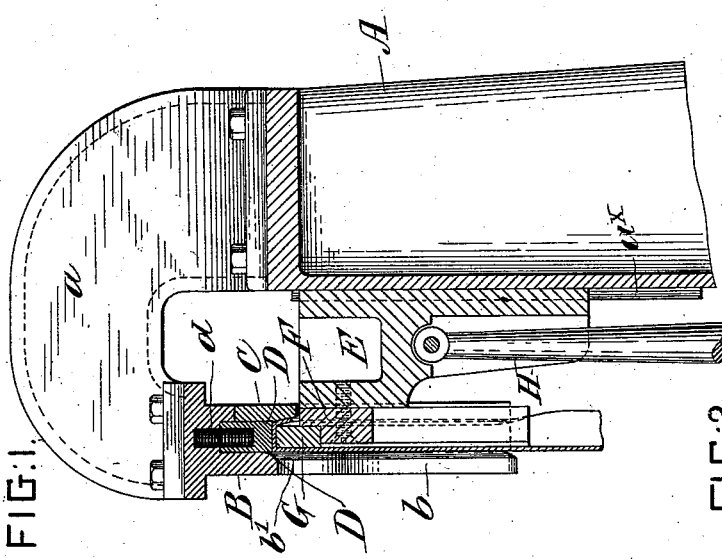
Witnesses:
Inventor:
William Westlake
by Henry Connett
his Attorney

UNITED STATES PATENT OFFICE.

WILLIAM WESTLAKE, OF BROOKLYN, NEW YORK.

MACHINE FOR FLANGING SHEET METAL.

SPECIFICATION forming part of Letters Patent No. 533,976, dated February 12, 1895.

Application filed August 20, 1894. Serial No. 520,759. (No model.)

*To all whom it may concern:*

Be it known that I, WILLIAM WESTLAKE, a citizen of the United States, residing at Brooklyn, in the county of Kings and State of New York, have invented certain new and useful Improvements in Machines for Flanging Sheet Metal, of which the following is a specification.

My invention relates to the class of machines for turning a flange, with dies, on a sheet of metal having a round corner and straight side, and the object is to provide a simple machine whereby a square box-flange may be turned on the edge of a sheet metal stove-board or platform, to form what is called a shell to receive a square-edged wood lining or backing made up of sections and fitted into the box-flange of the shell.

The invention will be fully described hereinafter and its novel features carefully defined in the claims.

In the accompanying drawings, which serve to illustrate an embodiment of the invention—Figure 1 is a mid-section of the upper part of the machine taken in the plane indicated by line 1, 1, in Fig. 2, the upper part being shown in full, and Fig. 2 is a front elevation of the same part of the machine. In Fig. 1 the dies are represented as closed on a metal sheet, and in Fig. 2 they are represented as open. Fig. $2^a$ is a sectional detail view of the cushioned corner die and Fig. $2^b$ is a section on line $2^b$ in Fig. 2. Fig. 3 represents the sheet of metal with the primary flange turned thereon, and Fig. 4 represents it in elevation and section with the second flange turned thereon. Fig. 5 shows the flanged sheet or shell in section with the wood lining in place therein.

In the principal views I have only shown the upper part of the machine as in it are embodied all the features of novelty. The lower part may be constructed in the same manner as other machines of this general class.

A represents a strong, upright frame, which will be of cast iron by preference. The drawings show only the upper part of the frame, but the base will be, or may be of the usual form. Secured by screws or bolts to the overhanging head, $a$, of the frame is the holder, B, of the stationary die, C. The holder B is angular in form, as well as the die C, and has the rabbeted form seen in the cross-section, Fig. $2^b$; that is, it has overhanging ledges, $b$, and at the angle (Fig. 2) these ledges are cut away for reasons that will be explained.

The die C is a strip of steel, of oblong, rectangular cross-section, as seen in Figs. 1 and $2^b$, and has the form of an inverted V, with the angle rounded to conform to the rounded corner of the sheet to be flanged. This die is secured to the holder, preferably by screws.

Mounted in the holder B, at the angle of the same, is a cushion die, D, seen best in Figs. 1 and $2^a$. This die rests in a recess, $b^\times$, in the holder B, and is backed by a very strong spring or springs, $d$, preferably two or more. These springs press the die D forward as seen in Fig. $2^a$, until the shoulders, $d^\times$, thereon engage stop-shoulders in the recess of the holder. The front edge or face of the die D is curved or concaved, as shown, to fit the rounded corner of the sheet to be flanged.

Mounted in guides, $a^\times$, on the frame A, is a reciprocating sliding carrier, E, on which is mounted and fixed the holder, F, of the moving die, G. The holder F and die G are counterparts, as to their angular form, of the stationary die and its holder, and the die G rests in a rabbet in the holder and projects beyond the front edge or face of the same. The moving die is in the same plane with the die D (see Fig. 1) and with the rabbet in the stationary holder B.

Fig. 3 represents the sheet X (or a part thereof) as it comes from the flanging machine which turns on its edge the deep primary flange $x$. This sheet is hooked onto the die G, when the latter is retracted as in Fig. 2, and when the die G advances, the sheet is carried in under the overhanging ledges $b$, which serve to hold the plate down firmly to the die G.

The holder B is cut away at $b'$ (Fig. 2) to allow the operator to keep his fingers pressed upon the sheet at the angle or corner thereof until the sheet is fairly gripped by the dies This is important in order to assure the holding of the sheet firmly in place on the die G. As the sheet advances, the face of the flange $x$ at the rounded corner of the sheet, impinges on the projected cushioned die D, where it is firmly gripped with all the tension of the springs $d$. The die D now yields and the stationary die C turns the flange $x'$, (Fig. 4) under the die G, laying it nearly at right-angles to the flange $x$. The moving die G is square on its operating face or edge and is of the thickness of the backing or lining, $y$, seen in Fig. 5. The flange $x'$ is not turned quite at right-angles to the flange $x$, but to about eighty or eighty-five degrees, as seen in Figs. 4 and 5, in order to facilitate the after insertion of the lining $y$. The moving die, carrying the flanged shell, now moves back or down to the position seen in Fig. 2, where the sheet is lifted off therefrom. It will be observed that the undersides of the overhanging ledges $b$ on the holder B, are rounded or chamfered off along their margins. This is to ease the primarily flanged sheet under the same. It will be understood that in thus flanging a stoveboard with four rounded corners, four separate operations are required to complete it.

The sliding carrier E is reciprocated by means of a connecting rod, H, coupled at its lower end to a crank on a shaft in the frame. This is a well known means for converting rotary into reciprocating motion and has not been illustrated for lack of room and for the reason that it is within the knowledge and skill of any good mechanic.

Having thus described my invention, I claim—

1. In a machine for flanging a metal sheet, the combination with the stationary, rabbeted holder B, provided with overhanging ledges $b$, and a finger-recess $b'$, and the stationary die secured to said holder, of the reciprocating die G, the die G having the angular form shown, with a rounded external angle, and adapted to fit into the rabbet of said holder, substantially as set forth.

2. In a machine for flanging a metal sheet, the combination with the fixed, angular holder, B, having overhanging, rounded ledges $b$, a folding die C, and a cushioned die D, at its rounded angle, of the reciprocating carrier E, and the angular die G, mounted on the said carrier and adapted to fit into the rabbet of the stationary holder, substantially as set forth.

3. In a machine for flanging sheet metal, the combination with the stationary, angular die-holder B, having a recess $b^\times$ at its angle, and the die D, with a concave face, mounted in said recess and provided with shoulders to engage limiting stops in said recess, the springs behind said die D, of the stationary flanging die and the reciprocating die for carrying the sheet to be flanged, all arranged to operate substantially as set forth.

In witness whereof I have hereunto signed my name in the presence of two subscribing witnesses.

WILLIAM WESTLAKE.

Witnesses:
   LEMUEL BURROWS,
   RALPH G. DUVALL.